United States Patent
Pons et al.

(10) Patent No.: US 9,397,781 B2
(45) Date of Patent: Jul. 19, 2016

(54) METHOD AND APPARATUS FOR IMPROVING PERFORMANCE OF TRANSMIT CONTROLLED ADAPTIVE MODULATION IN XDSL AND G.FAST SYSTEMS

(71) Applicant: IKANOS COMMUNICATIONS, INC., Fremont, CA (US)

(72) Inventors: Julien Daniel Pons, Metuchen, NJ (US); Murli Mohan Rao, Fremont, CA (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/661,177

(22) Filed: Mar. 18, 2015

(65) Prior Publication Data
US 2015/0270924 A1 Sep. 24, 2015

Related U.S. Application Data

(60) Provisional application No. 61/954,838, filed on Mar. 18, 2014.

(51) Int. Cl.
*H04L 1/00* (2006.01)
*H04M 3/18* (2006.01)
(Continued)

(52) U.S. Cl.
CPC ............... *H04L 1/0003* (2013.01); *H04L 1/20* (2013.01); *H04M 3/18* (2013.01); *H04M 3/306* (2013.01); *H04L 1/0065* (2013.01); *H04L 27/3488* (2013.01); *H04L 27/366* (2013.01)

(58) Field of Classification Search
CPC ... H04L 1/0003; H04L 27/3488; H04L 27/00; H04L 3/18; H04L 3/306
See application file for complete search history.

(56) References Cited

U.S. PATENT DOCUMENTS 8,259,848 B2 * 9/2012 Malladi .................. H04L 5/023 375/260
2002/0106989 A1 * 8/2002 Aizawa ................. H04L 1/0001 455/67.11
(Continued)

FOREIGN PATENT DOCUMENTS

EP 2587703 A1 5/2013

OTHER PUBLICATIONS

"G.fast: Combining TCAM and RCAM," ITU—Telecommunication Standardization Sector, Study Group 15, Paris, France, Feb. 27-Mar. 2, 2012, 2012-02-4A-041, pp. 1-12.*
(Continued)

Primary Examiner — Sophia Vlahos
(74) Attorney, Agent, or Firm — Holland & Hart LLP

(57) ABSTRACT

According to certain aspects, the present invention improves upon the conventional TCAM scheme by allowing a traditional TCM scheme to be used while in RCM mode. In a RCM mode according to embodiments of the invention, the system uses traditional TCM+SNR margin (i.e. SNRM) with a receiver controlled bit allocation table (BAT) and tone ordering table (TOT). In a TCAM mode according to embodiments of the invention, the system uses uncoded hierarchical modulation similar to the modulation originally proposed for TCAM. According to certain aspects, the transmitter in RCM mode in embodiments of the invention can determine when line conditions require a switch to TCAM mode, and signal the transition to the receiver. Likewise, when in a TCAM mode according to embodiments of the invention, the receiver can request to switch back to RCM via a SRA mechanism, for example.

20 Claims, 4 Drawing Sheets

(51) Int. Cl.
*H04M 3/30* (2006.01)
*H04L 1/20* (2006.01)
*H04L 27/36* (2006.01)
*H04L 27/34* (2006.01)

(56) References Cited

U.S. PATENT DOCUMENTS

| | | | | |
|---|---|---|---|---|
| 2003/0084394 A1* | 5/2003 | Erving | ............... | H04L 1/0003 714/755 |
| 2005/0111565 A1* | 5/2005 | Pons | ............... | H04L 1/0041 375/265 |
| 2006/0023690 A1* | 2/2006 | Umashankar | ......... | H04L 5/0007 370/351 |
| 2008/0263426 A1* | 10/2008 | Zaleski | ............... | H04L 1/006 714/752 |
| 2009/0028268 A1* | 1/2009 | Locke | ............... | H04L 1/0047 375/295 |
| 2010/0281349 A1 | 11/2010 | Pons et al. | | |
| 2012/0307846 A1* | 12/2012 | Myung | ............... | H04H 60/11 370/537 |
| 2013/0058430 A1 | 3/2013 | Jain et al. | | |
| 2013/0279687 A1* | 10/2013 | Wei | ............... | H04L 1/0002 379/350 |
| 2014/0003560 A1 | 1/2014 | Kolze et al. | | |

OTHER PUBLICATIONS

International Search Report and Written Opinion issued Jun. 18, 2015 for PCT/US2015/021288.
ITU-T SG15 11RV-046, ITU—Telecommunication Standardization Sector, Study Group 15, Temporary Document 11RV-046, Richmond, VA Nov. 3-10, 2011, 4 pages.

\* cited by examiner

METHOD AND APPARATUS FOR IMPROVING PERFORMANCE OF TRANSMIT CONTROLLED ADAPTIVE MODULATION IN XDSL AND G.FAST SYSTEMS

CROSS-REFERENCE TO RELATED APPLICATIONS

The present application claims priority to U.S. Provisional Patent Appln. No. 61/954,838, filed Mar. 18, 2014, the contents of which are incorporated by reference in their entirety.

FIELD OF THE INVENTION

The present invention relates generally to xDSL (i.e. ADSL, VDSL, etc.) and G.fast systems, and more particularly to methods and apparatuses for improving performance of transmit controlled adaptive modulation (TCAM) in such systems.

BACKGROUND OF THE INVENTION

TCAM has been proposed in ITU-T SG15 11RV-046 (i.e. hereinafter "proposed TCAM"), the contents of which are incorporated by reference herein in their entirety, as a way to seamlessly adapt to quick variations of noise level that cannot be tracked with traditional seamless rate adaptation (SRA) or other on-line reconfiguration (OLR) schemes. The proposed TCAM scheme allows for a receiver controlled adaptive modulation (RCAM or RCM) mode to be used during lower and more stable noise level conditions. In the proposed TCAM, a hierarchical quadrature amplitude modulation (HQAM) scheme is used in both TCAM and RCAM modes, using bit loadings calculated by the receiver. The HQAM scheme separates a QAM constellation into "base" and "enhancement" layers and allows for mapping of data to "enhancement" layers in the constellation to be turned off by the transmitter during periods of high noise, thereby preserving adequate noise margin. When the receiver is thereafter able to perform an adequate noise measurement, it re-computes new bit loadings and sends them to the transmitter, which can then resume mapping of data to the "enhancement" layers according to the newly computed bit loadings.

The present inventors have noted that the proposed TCAM does not allow for coding such as inner trellis coded modulation (TCM) to be used, thereby reducing the system capacity in terms of transmitted bit-per-second when line conditions would otherwise permit it to be used (e.g. during RCAM mode). Accordingly, it would be desirable to have a system and method that overcomes these drawbacks, among others.

SUMMARY OF THE INVENTION

The present invention relates to methods and apparatuses for improving performance of TCAM in xDSL and G.Fast systems. According to certain aspects, the present invention improves upon the conventional TCAM scheme by allowing a traditional TCM scheme to be used while in RCM mode. In a RCM mode according to embodiments of the invention, the system uses traditional TCM+SNR margin (i.e. SNRM) with a receiver controlled bit allocation table (BAT) and tone ordering table (TOT). In a TCAM mode according to embodiments of the invention, the system uses uncoded hierarchical modulation similar to the modulation originally proposed for TCAM. According to certain aspects, the transmitter in RCM mode in embodiments of the invention can determine when line conditions require a switch to TCAM mode, and signal the transition to the receiver. Likewise, when in a TCAM mode according to embodiments of the invention, the receiver can request to switch back to RCM via a SRA mechanism, for example.

In accordance with these and other aspects, a method for performing xDSL or G.Fast communications according to embodiments of the invention includes, during a first noise condition on a line: performing a first modulation of data at a transmitter coupled to the line using parameters specified by a receiver coupled to the line, wherein the first modulation includes performing inner coding of the data; and during a second noise condition on the line: controlling, by the transmitter, the performance of a second different modulation of data at the transmitter.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, embodiments of the invention allow for forward error correction (FEC) and modulation schemes to be changed when a transmitter detects a threshold amount of change in the noise on the line. Embodiments of the invention are referred to herein as TCAM+. According to certain aspects, TCAM+ allows a traditional TCM scheme to be used while in receiver controlled modulation (hereinafter RCM or RCTCM) mode, while benefiting from other high throughput modulation schemes controlled by the transmitter during high noise conditions.

Figure 1:
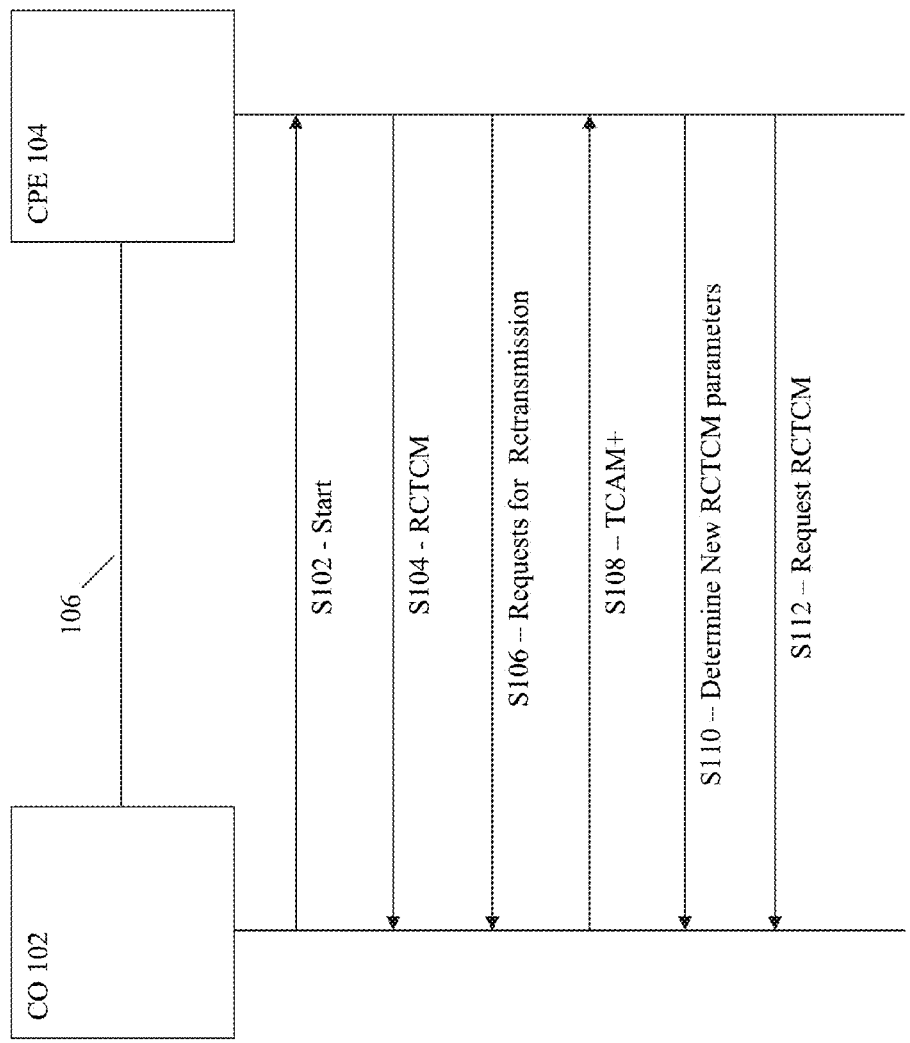
FIG. 1 is a block diagram illustrating components and operation of an example system for implementing TCAM+ according to embodiments of the invention.

FIG. 1 is a block diagram illustrating a system according to embodiments of the invention. As shown, the system includes a modem in a central office (CO) 102 and a customer premise equipment (CPE) modem 104 coupled via a line (e.g. twisted pair) 106.

Communications between modems 102 and 104 via line 106 can be in accordance with protocols such as ADSL2, VDSL2, etc (i.e. xDSL), or G.Fast. Modem 102 can be implemented by chipsets and associated firmware/software suitable for use in CO equipment (e.g. DSLAMs, etc.), as adapted with the functionality of the present invention. Those skilled in the art will be able to understand how to adapt such chipsets (e.g. Nodescale Vectoring products from Ikanos Communications, Inc.) after being taught by the present examples. Modem 104 can be implemented by chipsets and associated firmware/software suitable for use in CPE equipment (e.g. xDSL modems), as adapted with the functionality of the present invention. Those skilled in the art will be able to understand how to adapt such chipsets (e.g. Velocity, Vx18x and Vx68x chipsets from Ikanos Communications, Inc.) after being taught by the present examples.

A typical mode of operation of the system in 100 according to embodiments of the invention will now be described in connection with an example where the CO 102 modem is the transmitting modem and the CPE modem 104 is the receiving modem, with modulation and coding schemes being implemented in the "downstream" communications of typical xDSL and G.Fast systems. However, it should be appreciated that both of modems 102 and 104 can have both transmitters and receivers, and embodiments of the invention can be implemented in both directions of communications on line 106.

As shown in FIG. 1, modems 102 and 104 start communications in S102 which can include many initiation and training procedures known to those skilled in the art. Such procedures typically include the CO modem 102 learning the capabilities of the CPE modem 104 (e.g. highest supported protocols such as ADSL, VDSL, G.Fast, etc.), and then controlling further initiation procedures based on the detected capabilities.

As further shown in FIG. 1, and according to aspects of the invention, a CPE modem 104 begins operating in S104 in traditional RCTCM mode by default. This can include the modem 104 determining modulation and coding parameters such as a BAT, a TOT, etc., some parameters of which may depend on the protocol being used as will be appreciated by those skilled in the art, and communicating these parameters to modem 102.

During RCTCM mode, CO modem 102 uses a traditional TCM scheme to modulate downstream communications to CPE modem 104 using the parameters calculated by CPE modem 102 in S104.

According to further aspects of the invention, the CO modem 102 can cause communications with modem 104 to switch to TCAM+ mode in S108. This can be done when the CO modem 102 determines that a type or level of noise on line 106 exceeds a certain threshold. This can be determined, for example as shown in S106 of FIG. 1, when CPE modem 104 sends too many retransmission requests in a certain window of time. This decision can be signaled by CO modem 102 to CPE modem 104 using any of the various forms of overhead channels implemented in xDSL and G.fast (e.g., EOC or RMC).

It should be noted that, as shown in FIG. 1, in embodiments of the invention, the decision to transition from RCTCM to TCAM+ is typically initiated by the transmitter. But in other embodiments, the receiver can also suggest a transition to the transmitter, which may be chosen to be applied or ignored by the transmitter.

During TCAM+ mode according to embodiments of the invention, CO modem 102 uses error correction and modulation schemes to be described in more detail below, but using the same BAT and TOT that was used in the immediately preceding RCTCM mode. In embodiments, inner coding is not used in TCAM+ mode. Having communicated entry into TCAM+ mode, CPE modem 104 will be able to decode the data appropriately.

When it is able to do so after entering TCAM+ mode, in S110 CPE modem 104 calculates new RCTCM parameters such as a new BAT and TOT based on the current noise conditions. This can be done using conventional techniques known to those skilled in the art. As shown in S112, the CPE modem 104 can then request a switch back to RCTCM via the standard seamless adaptation rate (SRA) mechanism.

Thereafter, CO modem 102 can resume performing mapping and inner coding using the traditional TCM scheme using the new RCTCM parameters calculated by CPE modem 104 and communicated in S112.

Figure 2:
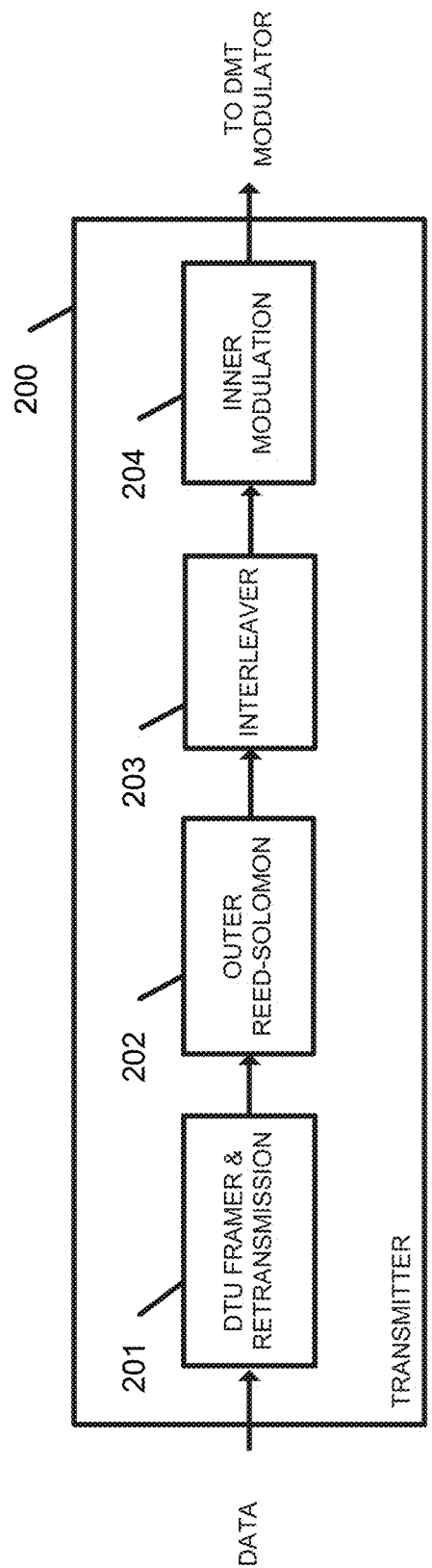
FIG. 2 is a block diagram illustrating an example digital transmit chain according to embodiments of the invention.

To further illustrate aspects of the invention, FIG. 2 depicts a block diagram of an example digital transmit chain 200 that can be included in CO modem 102 according to embodiments of the invention. As will be appreciated by those skilled in the art, chain 200 shows components used to map digital data to tones in DMT symbols, before the symbols are processed for crosstalk cancellation (in protocols that support vectoring) and converted to time domain signals. The details of such other processing are not necessary for an understanding of the present invention, and so further details thereof will be omitted here for sake of clarity of the invention. Nevertheless, it should be appreciated that modem 102 includes other components such as controllers that control the tasks performed by the components in chain 200. Those skilled in the art will be able to understand how to implement such controllers and other components after being taught by the present examples.

As shown, chain 200 includes a data transmit unit (DTU) framer and retransmission layer 201, an outer code 202, an interleaver 203 and an inner modulation 204. In embodiments, the outer code 202 is a Reed-Solomon (RS) code, which encodes DTUs as is well known in the art. DTU framer and retransmission layer 201 further protects the DTUs using a retransmission mechanism such as that described in G.inp or G.fast, depending on the protocol being used with the CPE modem.

Blocks 201 and 202 can be implemented using techniques known to those skilled in the art, perhaps including certain functionality for optimized retransmission for hierarchical modulation described in the proposed TCAM, and so further details thereof will be omitted here for sake of clarity of the invention. Meanwhile, blocks 203 and 204 implement the TCAM+ and RCTCM modes according to aspects of the invention, as well as the ability to switch between them, as will be described in more detail below.

In general, the inner modulation scheme implemented by block 204 during the RCTCM phase according to embodiments of the invention is the standard TCM (e.g. trellis coded QAM modulations using Ungerboeck/Wei set-partitioning). The interleaver block 203 is implemented such that the RS code output data is mapped to tones according to the retransmission procedures specified in the xDSL G.inp or G.fast standard, depending on the protocol used in communications with CPE modem 104.

Meanwhile, according to general aspects, during the TCAM+ phase in embodiments of the invention, the interleaver block 203 is implemented such that the RS coded output data is mapped to tones according to the proposed TCAM scheme (i.e., an uncoded hierarchical quadrature amplitude modulation or HQAM). In embodiments, no inner coding by block 204 is performed, thereby reducing coding-gain during the TCAM+ phase (relative to the RCTCM phase). This should not dramatically affect overall performance, because the expected time duration of the TCAM+ phase is usually very short. However, in other embodiments, it is possible for TCM to continue to be used, as long as a DTU mapping scheme to be described in more detail below is also used.

In embodiments, because different modulation schemes are used, the mapping of DTUs to tones is also different between RCM and TCAM+ phases, as will be described in more detail below. Different DTU mapping leads to a need for a clean transition between RCTCM and TCAM+. A natural transition period is at the superframe level, since standard xDSL and G.fast superframes consist of an integer number of DTUs (via use of dummy padding).

Nevertheless, the G.fast standard padding scheme can be modified to support transition at the TDD frame level for G.fast applications.

Unlike the proposed TCAM, which does not need signaling for transitioning from RCAM to TCAM, the transition from RCTCM to TCAM+ according to embodiments of the invention needs to be signaled to the receiver. In embodiments, signaling content is very small, and can consist only of the index of the DMT frame (or superframe) of action (FoA) in which the transition of modulation scheme is to be applied. According to certain aspects of the invention, no new bit allocation table (BAT) or tone ordering table (TOT) or other large table needs to be exchanged.

It should be noted that, in other embodiments, the same mapping of DTUs can be performed in both RCTCM and TCAM+ phases, using the mapping scheme for the TCAM+ phase as will be described below.

Figure 3:
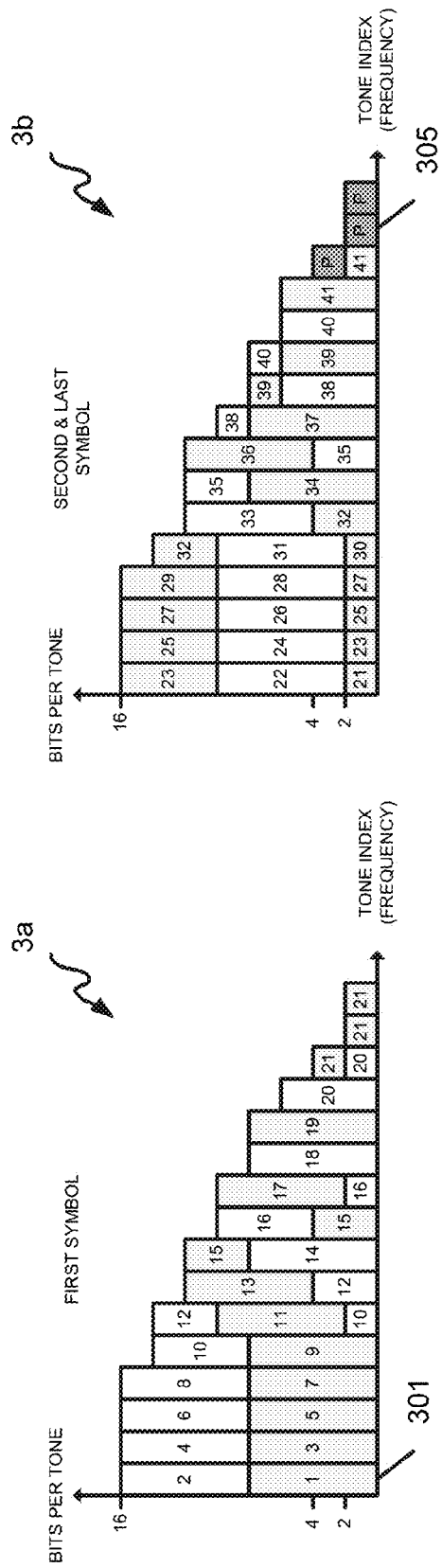
FIG. 3 provides an example illustration of the mapping of DTU to tones during a RCTCM phase according to embodiments of the invention.

FIG. 3 provides an illustration of how the mapping of DTU to tones is performed during the RCTCM phase in embodiments of the invention for a simplistic example of 8 bits per DTU, 16 loaded tones from 1 to 16 bits per tone, and a superframe of two DMT symbols 3a and 3b. As shown, the data bits from DTUs (after TCM encoding and tone reordering according to the TOT) are mapped in ascending order on the re-ordered tones. For example, element 301 shows the first DTU mapped to the first 8 bits of the first tone. The bit-allocation rule (i.e., the number of bits to be mapped to each individual tone) is dictated by the BAT, of which an example is shown in FIG. 3. As shown, mapping of one DTU to a tone can overlap adjacent DMT symbols (e.g. DTU number 21 in the example of FIG. 3), but padding 305 is used at the end of the superframe if the remaining slots in the superframe to be mapped cannot fit an entire DTU.

Figure 4:
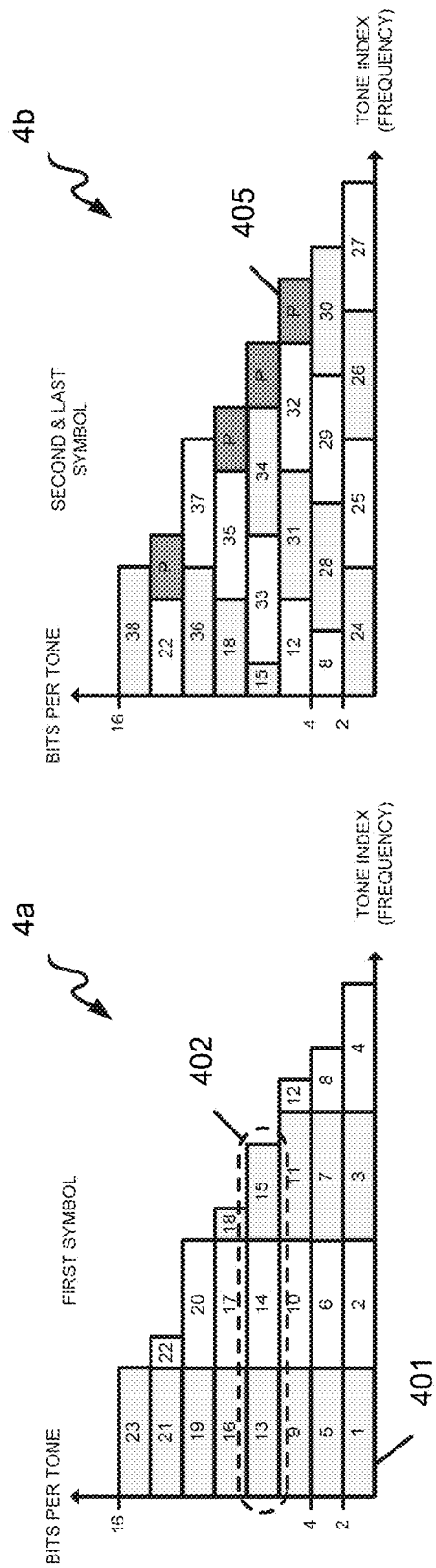
FIG. 4 provides an example illustration of the mapping of DTU to tones during the TCAM+ phase according to embodiments of the invention.

FIG. 4 provides an illustration of how the mapping of DTU to tones is performed during the TCAM+ phase in embodiments of the invention for the simplistic example of 8 bits per DTU, 16 loaded tones from 1 to 16 bits per tone, and a superframe of two DMT symbols 4a and 4b. The data bits from DTUs (after tone reordering according to the TOT) are inner modulated separately on "noise layers" in ascending order and then mapped to the re-ordered tones. For example, element 402 shows a noise layer of two adjacent bits (i.e. the seventh and eight available bits in this example) spanning across all tones to be loaded. It should be noted that a noise layer does not have to be two bits, but it can have any even number, with a power of two being preferable. Likewise, the number of noise layers does not have to be eight as in this example, but other numbers of noise layers are possible.

Meanwhile, element 401 shows the first DTU mapped to the first noise layer (i.e. the first and second available bits of all tones to be loaded) and the first 8 available tones to be loaded in the first symbol. The bit-allocation rule is dictated by the same BAT as that previously calculated by the receiver and used during the immediately previous RCTCM phase. As shown in FIG. 4, mapping of an individual DTU to tones can overlap several adjacent DMT symbols (e.g. DTUs 8, 12, 15, 18 and 22 in the example of FIG. 4), but padding 405 is used at the end of each noise layer in the superframe if the remaining slots in the noise layer to be mapped cannot fit an entire DTU.

It should be noted that, during a TCAM+ phase in embodiments of the invention, individual noise layers 402 can be turned off such that they do not carry any useful information (i.e. no DTUs are mapped to these layers). In this regard, it should be noted that FIG. 4, which shows DTUs mapped to all of layers 402 is not typical. The decision to turn off a specific layer is taken by the transmitter, for example based on a number of retransmission requests associated with DTUs mapped to that layer. In other embodiments, the specific layer(s) to turn off can be hardcoded. For example, upon entering TCAM+ phase, all but the most protected noise layers 402 can be turned off, and then additional less protected noise layers 402 can be turned back on one at a time until a threshold number of retransmission requests associated with DTUs mapped to that layer is reached. As another example, upon entering TCAM+ phase, all noise layers 402 can be turned on, and then the number of subsequent retransmission requests can be used to determine which layers 402 to be turned off.

In any event, this decision can be transparent to the receiver, which merely notes that no useful information is being transmitted on a layer that has been turned off. Those skilled in the art will be able to adapt the proposed TCAM scheme to turn off specific noise layers in the DTU mapping of FIG. 4 according to the invention similar to the manner in which "enhancement" layers are turned off in the proposed TCAM after being taught by the present examples.

According to certain aspects, the transition between RCTCM and TCAM+ phase at the superframe level in embodiments of the invention prevents DTUs from overlapping DMT symbols from the different phases. As a consequence, padding (i.e. dummy bits or bits containing non-information) is required for feeding the right amount of bits to the inner modulation scheme without changing the bit allocation rule. Padding is represented as elements 305 and 405 in FIG. 3 and FIG. 4, respectively.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for performing xDSL or G.Fast communications, comprising:
   during a first noise condition on a line:
      performing a first modulation of data at a transmitter coupled to the line using parameters specified by a receiver coupled to the line, wherein the first modulation includes performing inner coding of the data; and
   during a second noise condition on the line:
      controlling, by the transmitter, a second modulation of data at the transmitter, the second modulation different from the first modulation,
      wherein the second modulation includes splitting a number of bits per tone into a plurality of noise layers, and mapping bits of a data transmit unit (DTU) to a noise layer across a plurality of different tones.

2. The method according to claim 1, further comprising:
   determining, by the transmitter, determining, by the transmitter, that the second noise condition on the line exists.

3. The method according to claim 2, wherein determining comprises:
   detecting a threshold number of retransmission requests from the receiver.

4. The method according to claim 2, wherein controlling comprises:
   determining a time to begin the second modulation of the data; and
   signaling the time to the receiver.

5. The method according to claim 4, wherein the time corresponds to a superframe boundary.

6. The method according to claim 1, further comprising:
   during the second noise condition on the line, not performing inner coding of the data at the transmitter.

7. The method according to claim 1, wherein the inner coding comprises trellis coding modulation (TCM).

8. The method according to claim 1, wherein the parameters include a bit allocation table (BAT) and a tone ordering table (TOT).

9. The method according to claim 8, wherein the second modulation uses one or both of the BAT and the TOT.

10. The method according to claim 1, further comprising:
    after the second noise condition occurs, allowing the receiver to request a transition back to the first modulation.

11. The method according to claim 10, wherein the request is performed in accordance with a seamless rate adaptation (SRA) protocol.

12. The method according to claim 1, wherein the second modulation comprises hierarchical quadrature amplitude modulation (HQAM).

13. The method according to claim 1, wherein controlling the second modulation comprises preventing mapping of useful data to one or more of the plurality of noise layers.

14. The method according to claim 1, wherein controlling the second modulation comprises adding padding bits in one or more of the plurality of noise layers in a last symbol of a superframe.

15. A system for performing xDSL or G.Fast communications, comprising:
    a receiver coupled to a line; and
    a transmitter coupled to the line and configured to perform, during a first noise condition on the line, a first modulation of data using parameters specified by the receiver, wherein the first modulation of data comprises inner coding of the data; the transmitter being configured to control a second modulation of data different from the first modulation of data during a second noise condition on the line,
    wherein the second modulation of data comprises splitting a number of bits per tone into a plurality of noise layers and mapping bits of a data transmit unit (DTU) to a noise layer across a plurality of different tones.

16. The system according to claim 15, wherein the transmitter is further configured to determine that the second noise condition on the line exists.

17. The system according to claim 16, wherein the transmitter is further configured to detect a threshold number of retransmission requests from the receiver in order to determine that the second noise condition on the line exists.

18. The system according to claim 16, wherein the transmitter is further configured to determine a time to begin the second modulation of data and signal the time to the receiver.

19. The system according to claim 15, wherein the receiver is configured to request a transition back to the first modulation of data after the second noise condition occurs.

20. The system according to claim 15, wherein the transmitter is configured to prevent mapping of useful data to one or more of the plurality of layers in order to control the second modulation of data.

* * * * *